(12) United States Patent
Handa

(10) Patent No.: US 8,302,802 B2
(45) Date of Patent: Nov. 6, 2012

(54) INSTALLATION OF GAS ABSORBENT IN A HIGH PRESSURE TANK

(75) Inventor: Kiyoshi Handa, Tochigi (JP)

(73) Assignee: Honda Motor Co. Ltd., Tokyo (JP)

( * ) Notice: Subject to any disclaimer, the term of this patent is extended or adjusted under 35 U.S.C. 154(b) by 1160 days.

(21) Appl. No.: 11/756,065

(22) Filed: May 31, 2007

(65) Prior Publication Data

US 2008/0296306 A1   Dec. 4, 2008

(51) Int. Cl.
*B65D 88/12* (2006.01)

(52) U.S. Cl. ......... 220/564; 220/562; 220/581; 220/592

(58) Field of Classification Search .................. 220/581, 220/562, 564, 592
See application file for complete search history.

(56) References Cited

U.S. PATENT DOCUMENTS

| 3,006,153 | A | * | 10/1961 | Cook ............................. 62/46.3 |
| 4,393,924 | A | * | 7/1983 | Asami et al. ............. 165/104.12 |
| 4,667,815 | A | * | 5/1987 | Halene ............................ 206/0.7 |
| 5,564,587 | A | * | 10/1996 | Falk et al. ..................... 220/501 |
| 6,015,065 | A | * | 1/2000 | McAlister ..................... 220/586 |
| 6,503,584 | B1 | * | 1/2003 | McAlister ..................... 428/34.1 |
| 6,591,617 | B2 | * | 7/2003 | Wolfe ............................. 62/46.3 |
| 6,796,453 | B2 | * | 9/2004 | Sanders ......................... 220/581 |
| 7,004,207 | B2 | * | 2/2006 | Finkelshtain et al. ............ 141/2 |
| 7,121,423 | B2 | * | 10/2006 | Sanders ......................... 220/581 |
| 7,418,782 | B2 | * | 9/2008 | Kimbara et al. ........... 29/890.03 |
| 7,687,178 | B2 | * | 3/2010 | Kabasawa et al. ............ 429/437 |
| 2003/0082427 | A1 | * | 5/2003 | Prasad et al. ..................... 429/34 |
| 2003/0160054 | A1 | * | 8/2003 | Stetson et al. ................ 220/577 |
| 2003/0209148 | A1 | * | 11/2003 | Myasnikov et al. ............ 96/146 |
| 2004/0182869 | A1 | * | 9/2004 | Kubo et al. .................... 220/581 |
| 2005/0000970 | A1 | * | 1/2005 | Kimbara et al. .............. 220/581 |
| 2005/0006393 | A1 | * | 1/2005 | Carter ............................ 220/581 |
| 2005/0006394 | A1 | * | 1/2005 | Fujihara et al. ............... 220/581 |

* cited by examiner

*Primary Examiner* — Anthony Stashick
*Assistant Examiner* — Christopher McKinley
(74) *Attorney, Agent, or Firm* — Porter Wright Morris & Arthur; Mark Duell

(57) ABSTRACT

Tubes packed with gas absorbent media are installed in radial sectors in a high pressure gas tank interior. When a tank is fully packed with gas absorbent tubes in all sectors, interstices in the internal spaces between the tubes, an internal heat exchanger may be centrally installed within the tank having conduits for high pressure gas flow in the tank in a configuration in accordance with the cooling and heating requirements of the particular tank system. Flanged ends on the tubes maintain spacing of the tubes, facilitating gas flow and absorption.

9 Claims, 6 Drawing Sheets

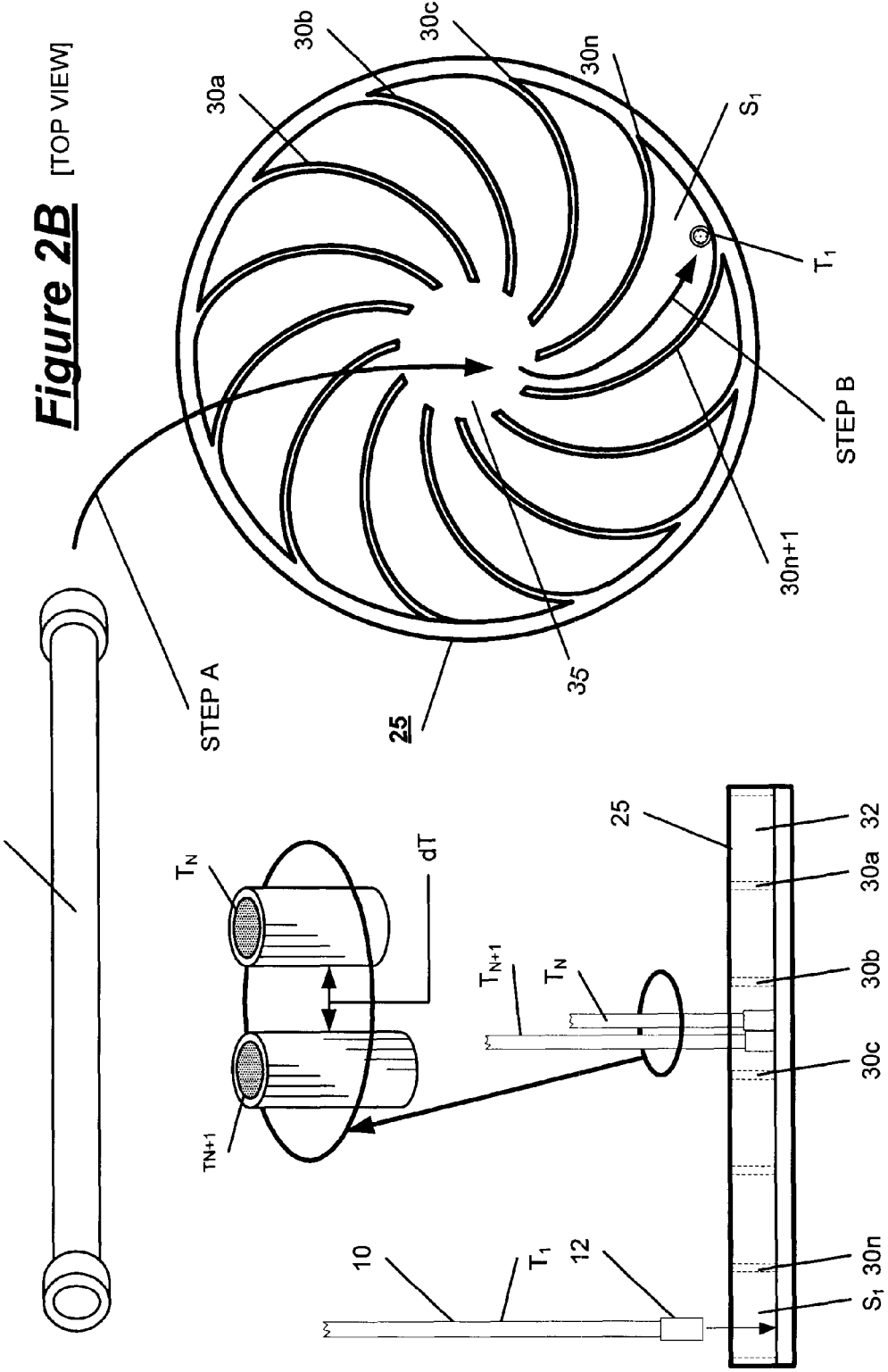

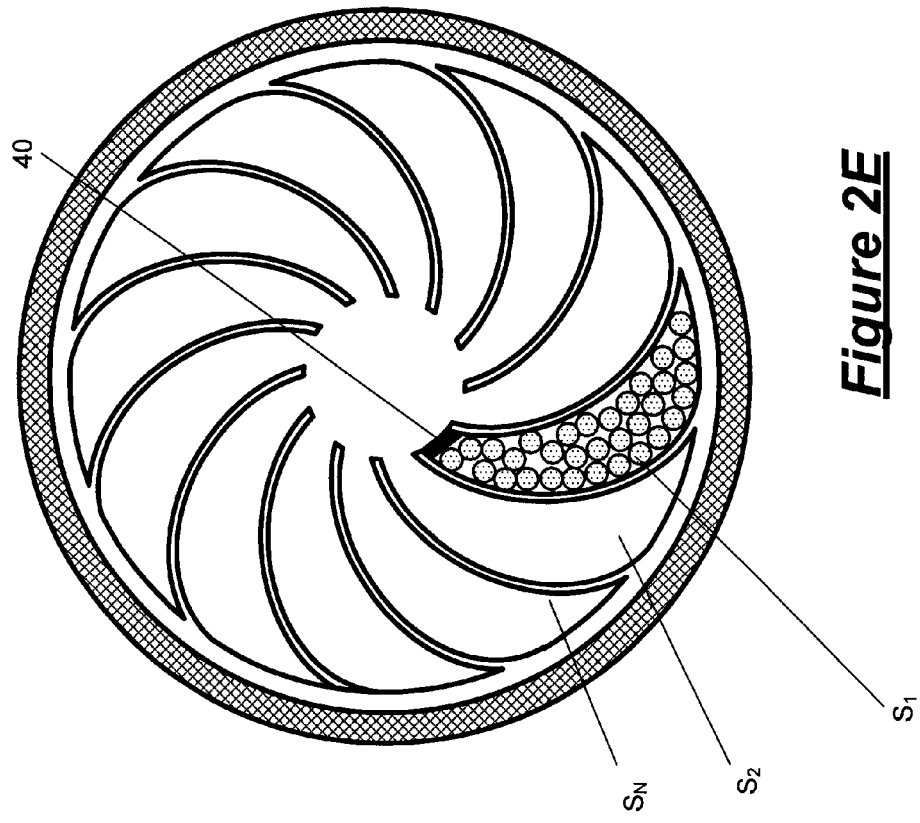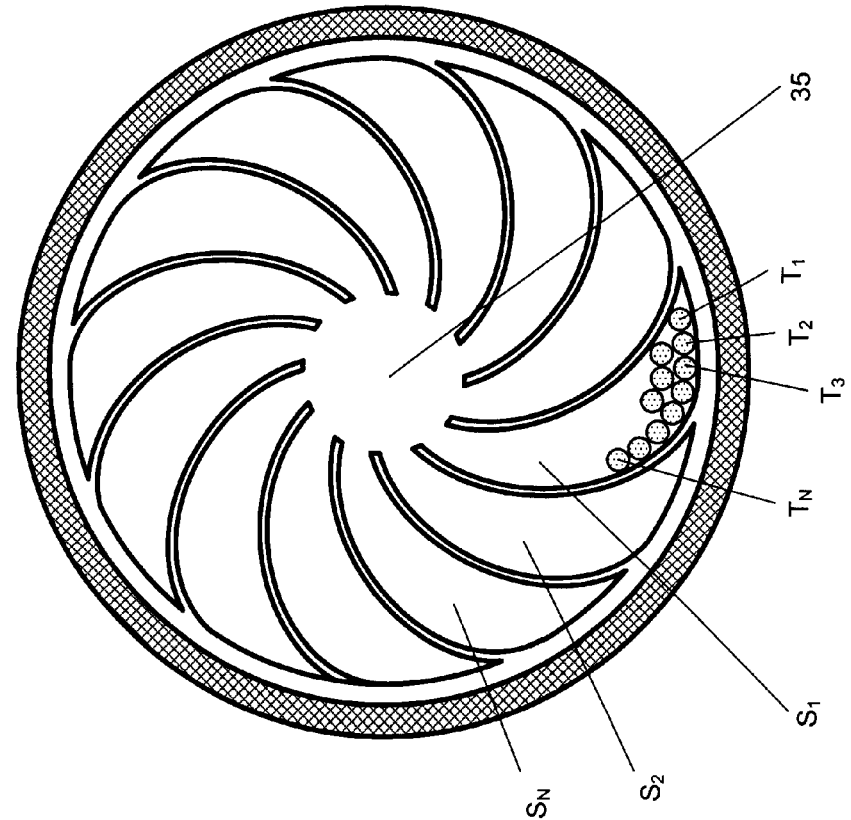

INSTALLATION OF GAS ABSORBENT IN A HIGH PRESSURE TANK

FIELD OF THE INVENTION

The present invention relates to the installation, within the internal tank volume, of a gas absorbent material useful with on board high pressure hydrogen and compressed natural gas [CNG] tanks installed in motor vehicles and other mobile applications. The installation of the absorbent material in accordance with the invention increases capacity of the tank per unit volume and permits the gas stored within the tank to be cooled during refueling and warmed during driving.

BACKGROUND OF THE INVENTION

A high pressure gaseous fueled vehicle, for example, powered by a fuel cell, or a hydrogen or CNG internal combustion engine, needs to have an extended driving range and a gas absorbent in the fuel gas tanks can increase the gas storage amount with respect to a given tank volume. In general, the absorbent, however, absorbs heat during driving and releases heat during refueling.

There is a need for an installation method for a gas absorbent media installed within the tank whereby heat transfer to and from the gas within the tank is not compromised. It is an object of the invention to install the absorbent in the tank; to transfer heat to the absorbent; to transfer (namely, both absorbing and releasing, as required by vehicle mode condition (refill or driving)) heat from the absorbent to the outside of the tank; and to provide an easy assembly of the media within the tank while accomplishing the foregoing objects.

SUMMARY OF THE INVENTION

In the invention, holders for heat absorbent media are provided along the axis of a fuel tank; the holders are installed during tank manufacture and include defined physical sectors for maintaining longitudinally extending tubes having a gas absorbent media packed therein within a defined sector. All sectors, encompassing 360° of the radial tank diameter are filled with the absorbent media tubes. In the invention, the gas absorbent is packed in a tube which is penetrative to the gas; the diameter of each tube is small enough to allow heat transfer from the inside of the tube to the outside; and spacers, such as flanges at the ends of the tubes maintain spaces and/or alignment of the multiple tubes within each sector. After one sector is filled with tubes, a cap is inserted at the interior open sector end to fix and to maintain the gas absorbent tubes therein. For the adjacent sector, the tank is rotated slightly and the next absorbent tube sector is similarly filled and capped, until all sectors are completed.

The invention is described more fully in the following description of the preferred embodiment considered in view of the drawings in which:

BRIEF DESCRIPTION OF THE SEVERAL VIEWS OF THE DRAWINGS

FIG. 2B is a plan view showing the beginning of the installation sequence for inserting a gas permeable tube within a fuel tank sector.

FIG. 2C is a side view showing the relationships in the installation sequence of the gas permeable tube and the side edges of the holder at one end of the tank.

FIG. 2D shows an intermediate stage in the installation sequence for inserting the gas permeable tubes in a fuel tank sector.

FIG. 2E shows a fully packed and sealed interior sector within the tank, as the tank is disposed to be rotated in a radial direction for installation of the tubes in the next adjacent fuel tank sector.

DETAILED DESCRIPTION OF THE INVENTION

Figure 1A:
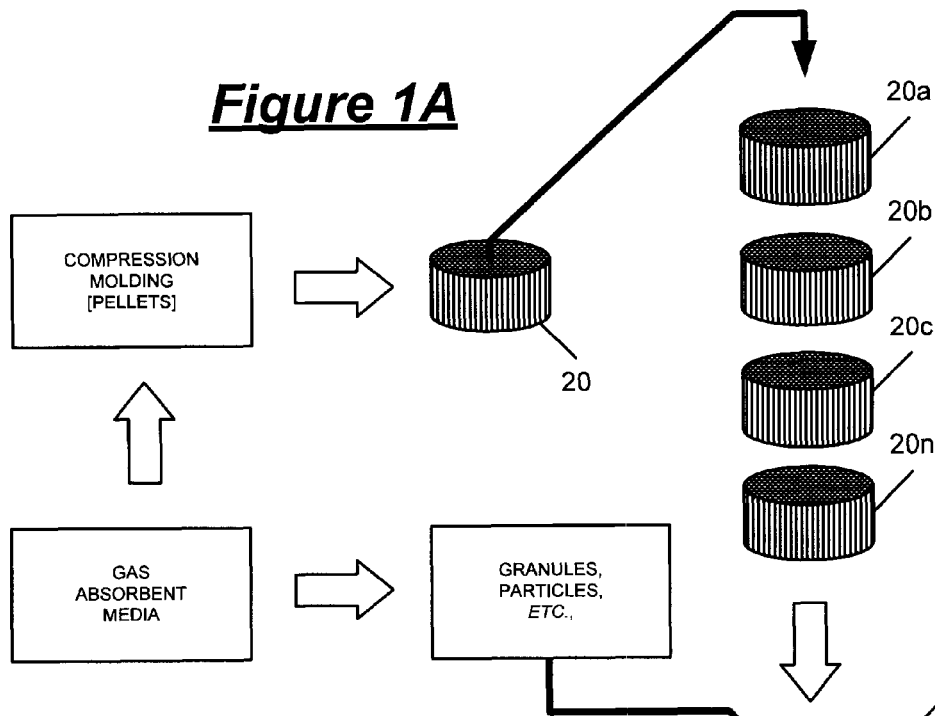
FIG. 1A and FIG. 1B show gas permeable tubes to be installed within a fuel tank sector packed with gas absorbent media, which may be in a particulate or granular form or compressed into pellets corresponding to the internal radius of the tube for insertion.

The invention increases the refueling energy efficiency of hydrogen powered vehicles by withdrawing the heat of refilling compression from the high pressure gas introduced into on board tanks whether or not a slow fill, a pressure overfill or pre cooling of the gas occurs at the refueling station. Because the invention reduces the overall energy required to recharge the on board vehicle tanks with high pressure gas to a full optimal state, overall infrastructure energy requirements are reduced. When a full refill is achieved, vehicle mileage range is increased, the need for short interval refills is reduced, and consumer satisfaction is enhanced. A cooling circuit is disposed within the on board tank circulating the refill gas through an in situ on board tank HEX 1. Heat absorbed in HEX 1 is conveyed by the circulating refueling gas to a second heat exchanger, HEX 2, exterior to the tank, where the absorbed heat is eliminated by an ambient temperature heat exchange.

The invention provides a vehicle tank for the storage of high pressure gas wherein the storage capacity of the tank is supplemented by the use of a gas absorbent material disposed within the tank. In an example, a plurality of longitudinally extending gas permeable tubes with gas absorbent media packed therein are secured in the tank in an ordered arrangement in which the tubes extend longitudinally along the length the tank, parallel to the tank. Multiple tubes are installed in radial arrays in the tank defined by separated radial arc sections of the cross sectional radial axis of the tank extending from a longitudinal central cavity in the tank. An internal heat exchanger is centrally located in a cavity within the tank, disposed such that the heat exchanger is surrounded by the tubes installed within the separated radial arc sections of the tank. A holder maintains the tubes in the ordered arrangement. The holder includes a central hub opening defining the longitudinal cavity and has radial arc spokes extending from the hub thereof to an outer perimeter rim that conforms to the interior diameter of the tank. The rim of each holder at either end of the tubes may include a circumferential lip in a facing relationship with the other holder. A circumferential lip may extend from the perimeter of the rim disposed in a facing relationship with the other holder to secure the tubes in place longitudinally within the tank. In the installation, the tubes are maintained in place with respect to the radial axis of the tank by a cap secured to the central hub opening between separated radial arc sections of the tank. Spacer flanges at both ends of the tubes separate the tubes in the array and permit gas flow in and from the tubes in the spaces determined by the flanges. The tubes may be packed with absorbent granules or serially stacked compression molded pellets and sealed at both ends.

A plurality of longitudinally extending gas permeable tubes with gas absorbent media packed therein extend longitudinally along the length the tank in arrays defined by separated radial arc sections of the cross sectional radial axis of the tank. A holder disposed at both ends of the tubes includes a central hub opening defining a longitudinal cavity within which an internal heat exchanger is disposed. The radial arc spokes extend from the holder hub opening to an outer perimeter rim conforming to the interior diameter of the tank, and spacer flanges included at both ends of the tube allow gas flow in and from the tubes within the tank by. The rim of each holder at either end of the tubes may include a circumferential lip in a facing relationship with the other holder and a cap inserted into the central hub opening between the separated radial arc sections of the tank secures the tubes within each arc sector. Preferably, the radial cross section of the gas absorbent tubes is circular. The system tubes may include an absorbent media for compressed natural gas or an absorbent media for hydrogen gas. In a completed array, the internal volume of the tank is essentially occupied by the spaced apart absorbent tubes and the tank will includes a central, cylindrical, longitudinally extending cavity within which the internal heat exchanger is disposed. Inlet and outlet ports for the entry and exhaustion of gas into and from the tank and heat exchanger are also provided. In this manner, the fuel capacity of the tank, per unit volume, is increased by reason of the gas absorbent. During the refill process for the tank, the heat exchanger is utilized to cool the refill gas as the gas enters the tank and is absorbed by the media. During driving, when necessary, the heat exchanger is operated in reverse to heat the media so that the gas absorbed therein is released for use by the vehicle motive system. Concerning the mosed of vehicle operation and the respective need for cooling or heating of the gas within the tank, I am the inventor of numerous configurations of refill, heating and cooling systems utilized in high pressure gas tank applications that may be suitable for use with the present system. See, for example, my applications published to date: 1) Pressure Differential System for Controlling High Pressure Refill Gas Flow Into on Board Vehicle Fuel Tanks, application Ser. No. 11/468,160 filed Aug. 29, 2006; Publication Number 2007-0051423 published Mar. 8, 2007; 2) Gas Cooling Method Using a Melting/Solidifying Media for High Pressure Storage Tanks for Compressed Natural Gas or Hydrogen, application Ser. No. 11/381,005 filed May 1, 2006; Publication No. 2007-0000563 published Jan. 4, 2007; 3) System for Enhancing The Refill Capacity of High Pressure Storage Tanks for Compressed Natural Gas or Hydrogen, application Ser. No. 11/380,996 filed May 1, 2007; Publication No. 2007-0000562 published Jan. 4, 2007; 4) Pressure Powered Cooling System for Enhancing the Refill Speed and Capacity of On Board High Pressure Vehicle Gas Storage Tanks, application Ser. No. 11/380,429 filed Apr. 26, 2006; Publication No. 2007-0000561 published Jan. 4, 2007; 5) Gas Cooling Methods for High Pressure Storage Cylinder Fuel Tanks on Vehicles Powered by Compressed Natural Gas or Hydrogen, application Ser. No. 11/279,574 filed Apr. 13, 2006; Publication No. 2007-0000016 published Jan. 4, 2007. Other pending applications that I have filed are not yet published.

Figure 1B:
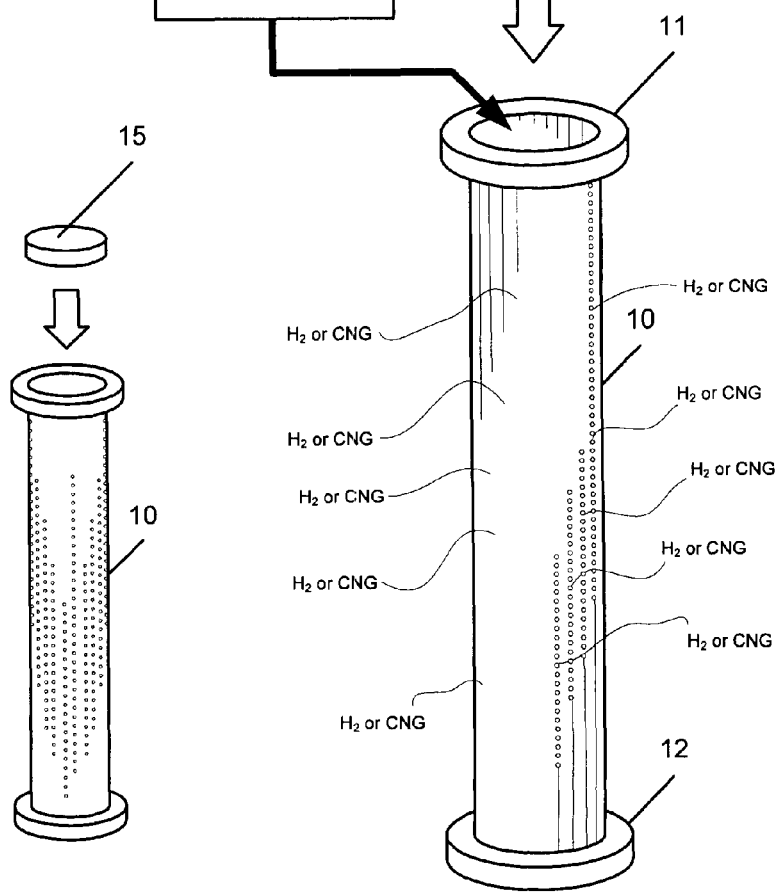

A gas permeable tube for installation within a sector of a fuel tank is shown in FIG. 1A and FIG. 1B. Hydrogen, $H_2$ or CNG is shown in FIG. 1A migrating into the permeable tube 10. The gas permeable tube 10 is provided with flanges 11 (open on one end) and 12 (preferably closed on the other end of the tube) on either end. The flanges space tubes apart from each other, allowing gas circulation in the tank and in the tube. As shown in FIG. 1A, the tube 10 is packed with a gas absorbent media such as the pellets shown as 20, 20a, 20b, 20c, and 20n. Absorbent materials suitable for use with the invention are known materials. Examples for hydrogen include metal organic frameworks, metal hydrates, carbon nano tubes, ion compexes, and the like. For CNG, activated carbon, etc., are suitable. In a high pressure tank in the context of a motor vehicle, a typical tank volume measure, for example, would be 167 L.

Alternatively, particulate or granular gas absorbent material may be packed into the tube. After the tube is packed any open end(s) of the tube is/are sealed with a plug 15 as illustrated in FIG. 1B. The tubes intended to be installed in the tank are thus packed with gas absorbent media, which may be in a particulate form or compressed into pellets for insertion as shown in FIG. 1A.

Figure 2A:
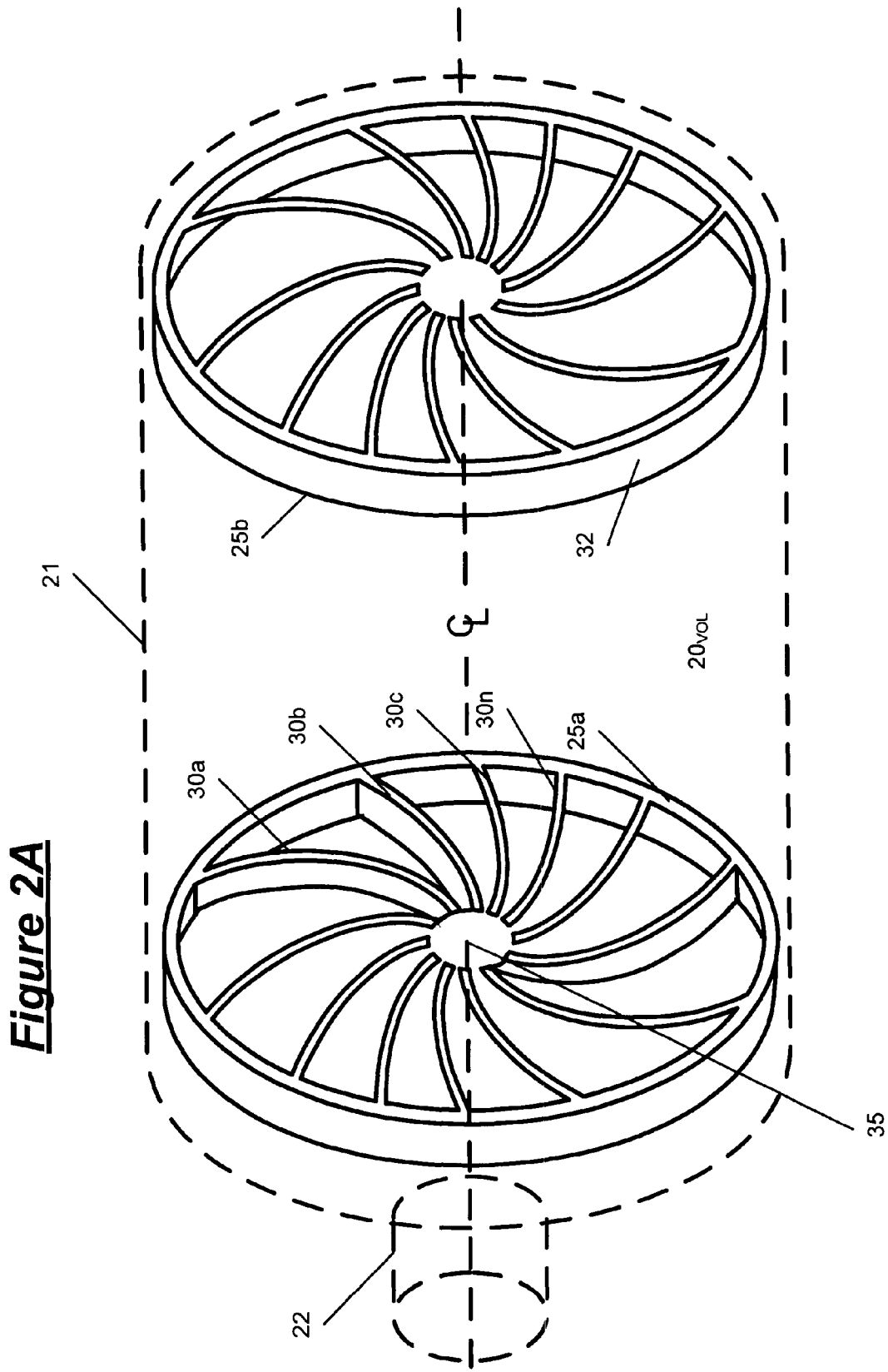
FIG. 2A shows a tank interior configuration illustrating the interior sector dividers disposed at the interior ends of the tank, aligned along the tank center line.

In FIG. 2A, a high pressure tank 21, typically formed of reinforced fiber composite for high pressure mobile gas storage applications, is shown having an end piece or boss 22 at one end thereof. Depending on design considerations for gas flow, an openable boss may be included at one or both ends allowing access to the tank interior $20_{VOL}$ and positioning conduits therein to allow gas flow into and out of the tank. Internal sector dividers 25a and 25b are installed as shown at opposite internal end sections of the tank within the tank interior, preferably during the process of tank fabrication. The sector dividers 25a and 25b are essentially identical, having a circumferential shape corresponding to the tank cross section. The sector dividers shown are smaller in diameter than the inside diameter of the tank, allowing a radial tolerance between the internal tank wall and the outside radius of the divider. The dividers are aligned along the longitudinal center line $\mathcal{C}_L$ 35 of the tank. The sector dividers may include raised edges or rims 32 and corresponding extended sector separators 30a, 30b, 30c . . . 30n for maintaining the packed tubes in the sectors formed thereby. The dividers maintain the packed permeable tubes in a fixed longitudinal position within the tank. In FIG. 2A, the raised sector rim is shown at 32 on divider 25b and individual dividers are shown at 30a, 30b, 30c . . . and 30n on divider 25a. FIG. 2B is a plan view showing the beginning of the installation sequence for inserting a gas permeable tube within a fuel tank sector. A packed tube 10, indicated as Tube 1, $T_1$ is inserted in a longitudinal orientation parallel to the tank longitudinal axis (center line) 35 through an opening in the boss, Step A. Insertion of the tubes is preferably while the tank is in a horizontal orientation and the tube is parallel to the center line of the tank. Upon insertion, $T_1$ will fall into a sector, $S_1$ formed by sector dividers 30n and 30n+1 as shown in FIG. 2B, Step B. FIG. 2C includes a side view of the sector divider 25a showing the sector rim 32, sector dividers 30a, 30b, 30c . . . and 30n, and the installation position of gas permeable tubes $T_N$ and $T_{N+1}$ in a sector formed by dividers 30b and 30c. The tubes are spaced apart a distance dT corresponding to twice the difference between the tube radius and the tube flange radius.

FIG. 2D shows an intermediate stage in the installation sequence for inserting the gas permeable tubes in a fuel tank sector wherein a multiplicity of gas permeable absorbent tubes $T_1$, $T_2$, $T_3$, and . . . $T_N$, are loaded into sector, $S_1$. When sector, $S_1$ is fully loaded as shown in FIG. 2E, a cap 40 in affixed to the interior sector opening in the divider facing the center line 35, completing the installation of all tubes in the first sector. As indicated in FIG. 2E, the tank is then rotated radially to allow access to a second sector, $S_2$ whereby the process of filling the sector with the tubes is repeated. The installation is completed when the configuration of the tank interior is such that all sectors defined by the dividers are filled with the gas absorbent tubes. FIG. 2E shows a first fully packed and sealed interior sector within the tank, whereupon the tank is next disposed to be rotated in a radial direction for installation of the gas permeable tubes in the next adjacent fuel tank sector defined by the divider.

Figure 3A:
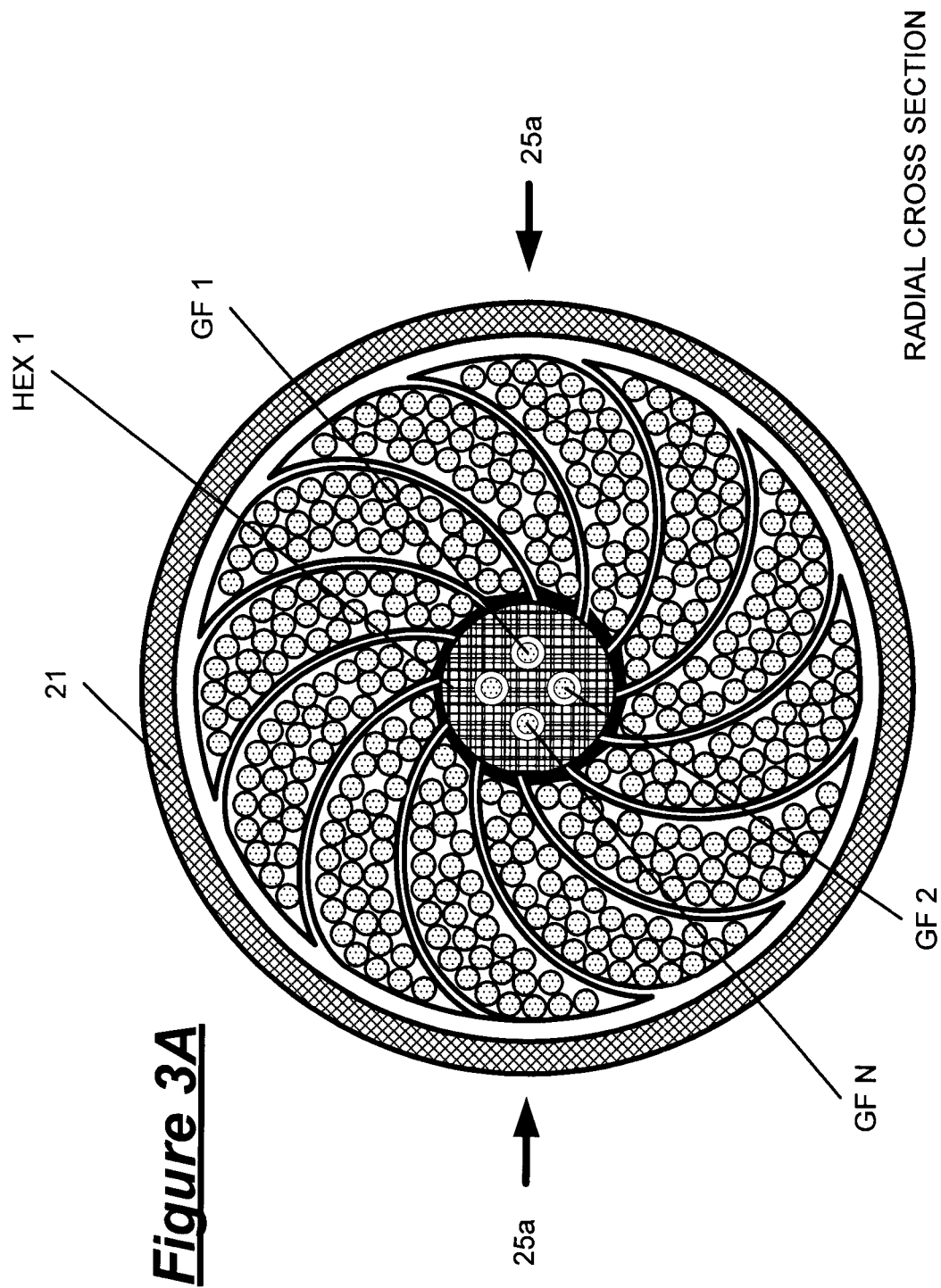
FIG. 3A is a radial cross section view intermediate a tank sector divider showing a tank fully packed with tubes and including an internal heat exchanger centrally installed therein.
Figure 3B:
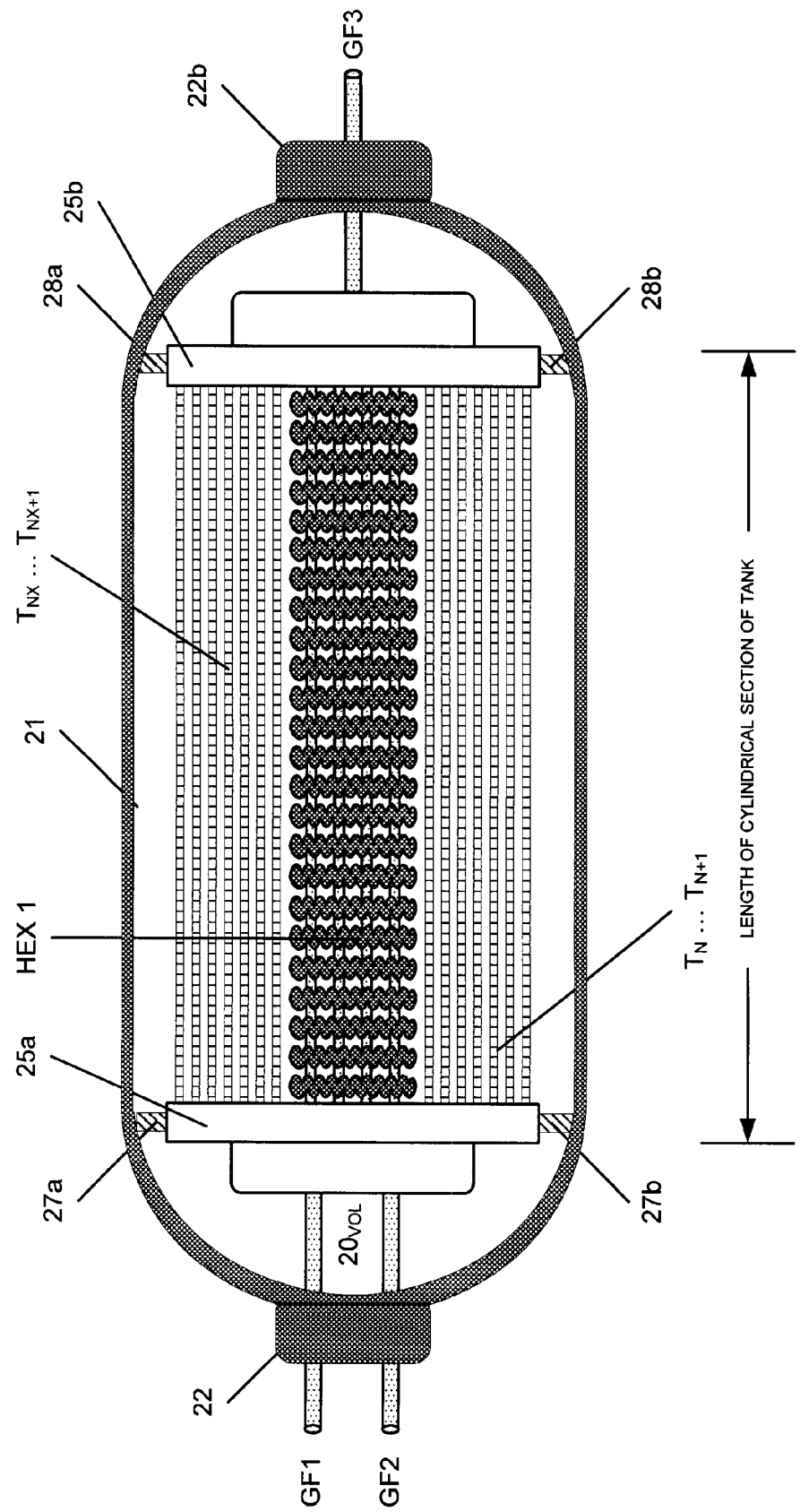
FIG. 3B is a side cross section view of a tank showing a tank fully packed with longitudinally extending tubes and with a center internal heat exchanger installed therein.

FIG. 3A shows all sectors in a tank 21 fully packed with gas absorbent tubes therein. An internal heat exchanger HEX 1 is centrally installed in the tank having gas flow conduits GF 1, GF 2 . . . GF N for high pressure gas flow through the heat exchanger, configured in accordance with the predetermined gas flow, cooling and heating requirements of the particular tank system. As is evident in the drawings, the interstices in the internal spaces allowed by the flanged ends of the tubes, within the sectors, assist in gas circulation around and through the absorbent media. FIG. 3B is a side cross section of the tank showing the dividers 25a and 25b supported in the tank interior by struts 27a and 27b and 28a and 28b. Bosses 22 and 22b are at each end of the tank. The permeable gas absorbent tubes are indicated by TNX . . . TNX+1. Gas flow inlet/outlet conduits are identified as GF 1, GF 2 and GF 3.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A high pressure fuel gas storage tank for a vehicle including at least one holder located inside the tank for maintaining a plurality of longitudinally extending gas permeable tubes with absorbent media packed therein, the holder comprising a rim located at, and having a shape corresponding to, a circumferential cross section of the tank, the rim having a plurality of separators extending therefrom to a central cavity of the holder containing a first heat exchanger, the separators forming radial arc sections, each section having an entryway at the central cavity of the holder; and a second heat exchanger exterior to the tank connected to the first heat exchanger in the tank wherein heat absorbed by the heat exchanger in the tank is eliminated by an ambient temperature heat exchange in the second heat exchanger.

2. A fuel tank for a vehicle, comprising:
(a) a tank, the tank having a generally cylindrical cross-sectional configuration that is generally symmetrical about a longitudinal centerline;
(b) a boss at one end of the tank, the boss being concentrically positioned about the longitudinal centerline of the tank;
(c) a tube holder located within the tank, the tube holder including at least one sector divider, the sector divider including:
(i) a circumferential rim in spaced relationship with the internal surface of the tank and
(ii) a plurality of circumferentially spaced radial dividers extending radially inwardly from the rim,
the radial dividers terminating at a location spaced from the centerline of the tank and defining an central cavity about the centerline that is aligned with the boss of the tank, the plurality of radially extending dividers defining a plurality of circumferentially separated tube spaces, each of tube spaces extending from the central cavity to the rim and having a closable opening to the central cavity;
(d) a plurality of tubes in each of the tube spaces, each of the tubes being supported at opposite ends of the tank by the spaced sector dividers and being disposed in one of the tube spaces, the separated tube spaces formed by the radial dividers being operative to separate groups of tubes in each of the tube spaces from tubes in other of the spaces; and
(e) a heat exchanger, the heat exchanger being configured to be insertable into the central cavity with tubes in the tube spaces.

3. A fuel tank as recited in claim 2 wherein the tube holder includes further includes an aligned pair of longitudinally spaced sector dividers, the sector dividers being located at opposite ends of the tank.

4. A fuel tank as recited in claim 2 wherein each of the tubes include spacer flanges at both ends operative to separate individual tubes within each of the tube spaces to facilitate gas flow about the tubes.

5. A fuel tank as recited in claim 2 wherein the tubes are packed with absorbent granules and sealed at both ends.

6. A fuel tank as recited in claim 2 wherein the tubes contain an absorbent media for compressed natural gas.

7. A fuel tank as recited in claim 2 wherein the tubes contain an absorbent media for hydrogen gas.

8. A fuel tank as recited in claim 2 further comprising a second heat exchanger exterior to the tank connected to the heat exchanger in the central cavity of the tank wherein heat absorbed by the heat exchanger in the tank is eliminated by an ambient temperature heat exchange in the second heat exchanger.

9. A fuel tank as recited in claim 2 wherein the radially extending dividers extend from the rim toward the longitudinal axis along an accurate path.

* * * * *